United States Patent [19]
Lesiak

[11] 3,958,344
[45] May 25, 1976

[54] TEACHING AID FOR TEACHING NUMBERS

[76] Inventor: Carole M. Lesiak, 7823 Oakhurst Circle, Brecksville, Ohio 44141

[22] Filed: Nov. 15, 1974

[21] Appl. No.: 524,077

[52] U.S. Cl. .............................. 35/31 R; 40/130 D
[51] Int. Cl.² ................... G09B 19/02; G09F 13/04
[58] Field of Search .............. 35/8 R, 9 B, 30, 31 R, 35/31 B, 31 C, 31 D, 31 F, 31 G, 32; 40/130 D, 132 D, 136

[56] References Cited
UNITED STATES PATENTS

| | | | |
|---|---|---|---|
| 1,228,391 | 6/1917 | Barr et al. | 35/31 R X |
| 1,536,449 | 5/1925 | Muller | 40/130 D |
| 2,050,805 | 8/1936 | Pumar | 35/9 B |
| 2,304,893 | 12/1942 | Dickson | 35/31 D |
| 2,498,578 | 2/1950 | Reinnagel | 35/9 B X |
| 2,512,837 | 6/1950 | Pescatori | 35/31 C |
| 3,077,677 | 2/1963 | Malkin et al. | 35/31 D X |
| 3,353,284 | 11/1967 | Hursh et al. | 35/31 F |
| 3,357,116 | 12/1967 | Bazacos | 35/31 F |
| 3,381,394 | 5/1968 | Munro | 35/31 F |
| 3,404,475 | 10/1968 | Coad | 40/130 D |
| 3,811,205 | 5/1974 | Pitzler | 35/32 |

*Primary Examiner*—William H. Grieb
*Attorney, Agent, or Firm*—Donnelly, Maky, Renner & Otto

[57] ABSTRACT

An educational device has a board divided into a plurality of individual spaces on each of which respective preferably raised numbers are located. Two switches are mounted in the board adjacent each number, and closure of one of the respective switches activates an electric circuit to illuminate that number, while closure of the other of the respective switches activates a second electric circuit to produce an audible indication. The numbers may be in one or more colors, and space is provided adjacent each number on which a student may write that number. Moreover, a respective set of one or more sockets is formed in the board adjacent each number to receive one or more pegs, and the number of sockets in each set corresponds to the actual number to which it is adjacent.

9 Claims, 4 Drawing Figures

U.S. Patent May 25, 1976 3,958,344
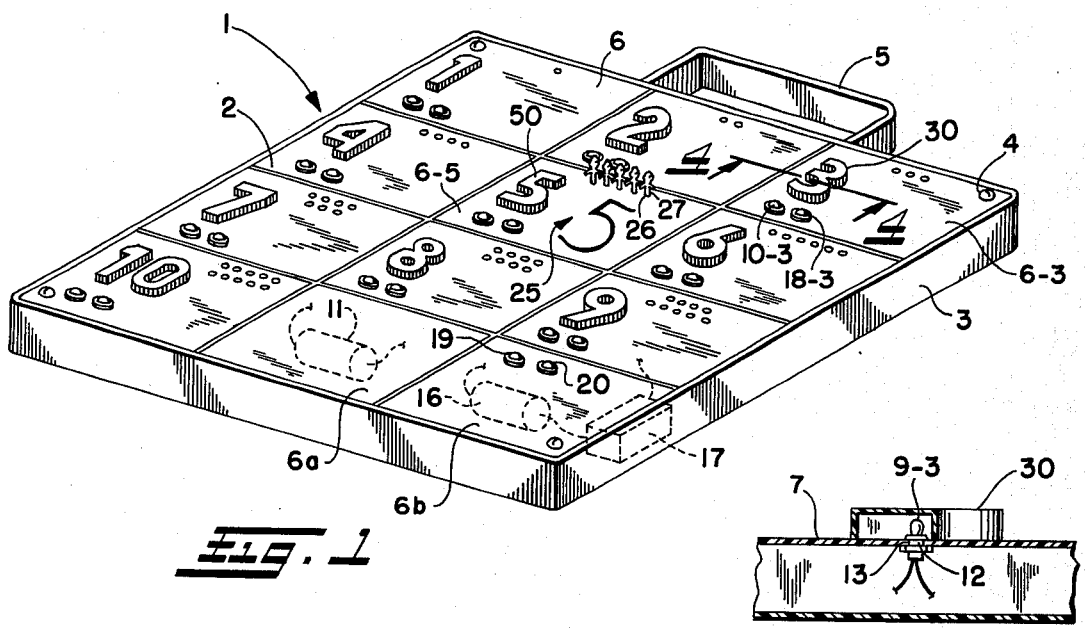
Fig. 1
Fig. 4
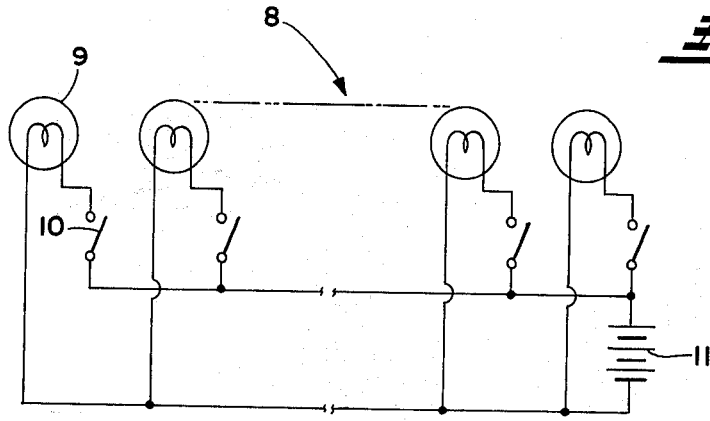
LAMP CIRCUIT
Fig. 2
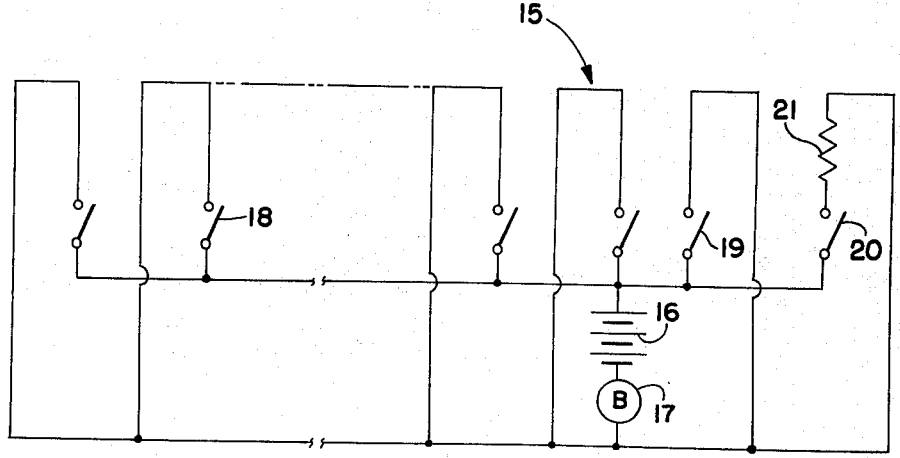
BUZZER CIRCUIT
Fig. 3

TEACHING AID FOR TEACHING NUMBERS

BACKGROUND OF THE INVENTION

This invention relates to educational devices for teaching numbers, counting and the like, and, more particularly, is directed to a teaching device that includes stimuli for a plurality of perceptual senses.

The learning of numbers and counting is one of the most important fundamentals of education, and the instant invention is directed to a teaching aid for facilitating the teaching of numbers, counting and the like, to make the educational experience relatively interesting and enjoyable and, therefore, efficient, especially in view of the relatively short attention span of young children, say in the age range of from three and one-half to five years. Several prior art devices for teaching numbers are disclosed in U.S. Pat. Nos. 1,228,391, 3,357,116, and 3,811,205; however, none of the prior art devices provides a teaching aid in accordance with the instant invention which is capable of stimulating a plurality of the user's senses while actively using the device.

SUMMARY OF THE INVENTION

A plurality of numbers are mounted on the surface of a board in a pattern that facilitates relatively smooth counting of the numbers in a logical manner, and switches are mounted on the board for actuation by the user to operate visual and audible indicators. In the preferred form of the invention each of the numbers is raised or roughened to stimulate the sense of touch; actuation of one of the switches effects illumination of a proximate number as a visual indicator to stimulate the visual sense, and actuation of another switch energizes a buzzer as an audible indicator to stimulate the sense of hearing. Moreover, adjacent each number is a space within which the user may write the number in pencil, ink or the like, and one or more sockets may be located adjacent respective numbers in a quantity corresponding to the adjacent number to receive a number of pins or the like.

With the foregoing in mind, it is a primary object of the invention to facilitate the teaching of numbers, counting and the like, including writing of numbers, and, more particularly, to facilitate teaching the recognition, perception, and conception of numbers.

Another object of the invention is to use the senses of touch, sight and/or hearing in the teaching of numbers, counting and the like.

An additional object of the invention is to increase and to maintain the interest of the student while teaching numbers, counting and the like.

A further object of the invention is to facilitate a teacher's observance of students' comprehension of numbers and the like from a relatively remote distance.

Still another object of the invention is to provide an educational device which is attractive both in overall appearance and in stimulating mechanical interest to facilitate the teaching of numbers, counting and the like.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is an isometric view of the teaching device of the present invention;

FIG. 2 is a schematic electric circuit diagram of an illuminating electric circuit for the teaching device illustrated in FIG. 1;

FIG. 3 is a buzzer electric circuit for the teaching device of FIG. 1; and

FIG. 4 is a cross-section view of a portion of the teaching device of FIG. 1 looking in the direction of the arrows 4—4 thereof.

DESCRIPTION OF THE PREFERRED EMBODIMENT

Referring now more particularly to the drawing, wherein like reference numerals designate like parts in the several figures, a teaching aid device in accordance with the present invention is generally indicated at 1 in FIG. 1. The teaching device includes a board 2 retained, for example, in a hollow frame 3 by screws 4. A handle 5 is attached to the device for carrying the same. The board 2 may be formed, for example, of plastic or other relatively rigid, strong material in one or more relatively appealing colors to stimulate the users interest.

In the preferred form of the invention the board 2 has a generally rectangular shape and is divided into a plurality of individual rectangular-shape spaces 6 at which respective numbers are located, such as the number three, which is designated by reference numeral 30. Alternatively, the shape of the board 2 and the overall teaching device 1 may be in the form of the fingers of a hand, in which case a user may count numbers on respective fingers, for example, from 1 to 10, or the device may be in the configuration of a child with respective numbers being located at various body portions to facilitate the teaching both of numbers and of body parts.

On the board 2 are located a plurality of numbers, each being positioned in a respective space 6, such as, for example, the number three, designated by the reference numeral 30. As illustrated, each of the numbers is raised and is preferably made of a translucent or transparent material, such as plastic, although the numbers also may be formed of a relatively rough material such as sand paper or the like or the plastic itself may be roughened. Moreover, each of the numbers and/or the spaces 6 within which they are located may be made respectively of one or more colors to enhance the interesting appearance of the device and to facilitate the use thereof also as an aid for teaching colors. If desired, the numbers may be of graduated size, whereby the number 1 would be of smallest size and number 2 of a large size, and so on, to manifest the concept of magnitude.

The respective numbers are arranged on the accessible surface 7 of the board 2 in a pattern which may be easily followed when counting the numbers, for example, as illustrated from 1 through 10, and the two dimensional array formed by the respective spaces 6 on the board and the numbers in the spaces also may be used to teach the concepts of direction, e.g. left and right, up and down, horizontal and vertical, etc. The numbers may be fixedly attached, e.g., by cement, to or molded as part of the board 2, or they may be removable for use, for example, as a puzzle-type game requiring sorting and may be reattached to the board by magnetic means, prong and socket connectors or other conventional connecting means.

A first electric circuit, which will be referred to as the lamp circuit, is generally indicated at 8 in FIG. 2. The lamp circuit 8 includes a plurality of electric lamps 9, each of which is connected through a respective switch 10, such as a push button switch or the like, for energization by a common battery 11. Thus, each of the lamps 9 and their respective switches 10 are effectively coupled in parallel with the battery 11. Moreover, each of the respective switches 10 is preferably positioned in the board 2 adjacent a respective number, as is illustrated, for example, by the switch 10-3 located adjacent the number three. Each of the lamps 9 is retained, for example, in a socket 12, that is mounted in an opening 13 in the board 2 beneath a respective number, such as the number three, designated by reference number 30, for illuminating the number as is illustrated in detail, for example, in FIG. 4. Therefore, in using the teaching aid the student may actuate the push button switch 10-3 by pressing the same at the number three, and as a result thereof the corresponding lamp 9-3 will light to illuminate the number. If desired, the respective numbers may be movably mounted in the board 2 in position to operate a respective switch 10; therefore, by pressing on the number the switch will close to light the corresponding lamp 9.

In using the switch and lamp arrangement in the teaching aid device 1, the teacher may instruct the student to push the light switch button 10 at the number three, for example, and may observe from a remote location whether the student understands which is that number. Moreover, to teach the meaning of the number three, the teacher may instruct the student to press the appropriate button switch three times, and the teacher also may remotely observe whether the student or students comprehend the quantity represented by that number.

It is felt that the required actuation of switches with the corresponding visual observation of lights in the teaching aid device 1 greatly enhances the appeal thereof to young students, especially to hyperactive and slow learning children. Therefore, the length of time that can be spent efficiently during each use of the device in a number teaching lesson may be expanded. Moreover, since the teacher is able to remain in front of the class, while still being able to observe at a distance whether the students comprehend the lesson, better class coordination and control is achieved.

The battery 11 and the wiring therefrom to the respective lamps 9 and switches 10 all may be located within the hollow interior of the teaching aid device 1. For convenience, although not illustrated, a pair of resilient contacts for holding and connecting to the battery, which is preferably a conventional one and one-half volt battery, may be located inside the box. Thus, all wiring is unexposed.

It is also contemplated that an additional switching circuit may be provided to the lamp circuit 8 for simultaneously energizing all of the lamps using a switch located, for example, in the lower right hand space 6a of the board 2, or such circuit may be modified to use only a single switch for simultaneous operation of all the lamps 9. Also, if desired, each of the lamps 9 may be mounted in the board 2 adjacent respective numbers instead of beneath and/or within the same. A further modification envisions using only a single lamp 9 that may be mounted, for example, in the space 6a on the board 2; and although such arrangement would not provide for individually illuminating each of the numbers on the board, the user may still gain the satisfaction of pushing a button to energize the lamp, and the mentioned counting sequence, e.g., pushing the lamp three times to represent the quantity three, still may be observed by a remotely stationed teacher.

In addition to stimulating the sense of touch, whereby a student may touch the individual numbers on the board 2 and the sense of sight, whereby the user may view the respective numbers and illuminate the same by pressing on respective switches 10, a buzzer circuit which is generally indicated at 15 in FIG. 3, is also provided in the teaching aid device 1. The buzzer circuit 15 includes a power supply 16, such as a conventional 1½ volt battery, a conventional buzzer 17, or other similar audible indicator, such as a bell, and a plurality of switches 18, each being connected to provide a closed circuit for energization of the buzzer by the battery. Each of the switches 18 is positioned in the board 2 adjacent a respective number in the space 6 provided therefor, and the switches 18 may be colored differently from the switches 10. If desired, the power supply for the lamp circuit 8 and for the buzzer circuit 15 may be shared. In utilizing the buzzer circuit 15 of the teaching aid device 1, the teacher may instruct the students to press the buzzer switch 18-3, for example, at the number three three times and may listen to learn whether individually or collectively the students comprehend the quantity represented by that number.

Preferably the battery 16 is located within the hollow interior of the teaching aid device in a pair of conventional resilient electrical contacts, not shown. If it is desired to reduce the number of switches 18 required in the teaching aid device 1, a single buzzer operating switch may be located, for example, in the lower right hand space 6b of the board 2.

Two additional switches 19, 20 may be used to indicate to the student the difference between loud and soft sounds by providing for actuation of the buzzer either directly or via a resistor 21 or the like. When power is provided to the buzzer 17 through the resistor 21, a reduced sound level is produced thereby. Moreover, the switches 19 and 20 may be differently colored.

Preferably in each space 6 the relatively open area adjacent each of the respective numbers, such as the area indicated at 25 adjacent the number five, which is designated by the reference numeral 50, is of a material on which pencil lead, ink, crayon or the like may be used by the student to write the adjacent number. For example, in the area 25 the number five is written. Moreover, if the respective numbers, such as the number five, are removable, the student may actually trace the numbers in the space provided in order to teach manual formation of the numbers.

Also, in each of the spaces 6 adjacent respective numbers is located a set of one or more openings or sockets 26 into which respective pegs 27 may be inserted. The number of openings or sockets in each respective set corresponds to the number in that particular space. Thus, for example, the space 6-5 within which the number five is found has five such sockets 26 into which five pegs 27 are inserted. The pegs 27 may be simply straight pegs or they may be, for example, in the shape of children, as is illustrated in the figure, to further develop the interest of the young student in using the teaching aid device 1. The pegs may be used to teach the quantity represented by respective numbers and to teach counting.

From the foregoing it should now be understood that the teaching aid device of the present invention facilitates the teaching of numbers, counting and the like by providing selective stimuli to various senses of the student. The device, therefore, is interesting and effective in holding the user's attention, and facilitates the teacher in conducting a lesson by providing remote indications of the students' comprehension. Moreover, when the teaching aid device 1 is used without the buzzer, a number of students may use respective devices simultaneously without causing distraction to other students.

The embodiments of the invention in which an exclusive property or privilege is claimed are defined as follows:

1. An educational device for teaching numbers by stimulation of plural senses of the user, comprising:
   an integral package including a container-like support and a board coupled to said support to define a closed hollow interior portion, said board having an accessible, generally planar surface, and said accessible surface being divided to a plurality of easily distinguishable discrete spaces;
   a plurality of different numbers on said board, each of said numbers being located on said surface in a different respective discrete space to facilitate distinguishing between numbers, each of said numbers being raised relative to the plane of said surface, and said numbers also being positioned in a pattern to facilitate counting said numbers in a logical order; and
   a self-contained electric circuit in said package, including power supply means for supplying electric power, switch means for closing at least a portion of said electric circuit, said switch means being mounted on said board for convenient access, and electrically responsive sensorially perceivable indicator means coupled to said power supply means and to said switch means for indicating closure of said switch means, said indicator means comprising a plurality of lamps, each being positioned relative to a respective one of said numbers for illuminating the same, said switch means comprising a plurality of switches, each being positioned proximate a respective number in the discrete space thereof and coupled with a respective lamp positioned for illuminating such number for selective energization thereof, said power supply means being entirely within said hollow interior portion of said integral package;
   said indicator means further comprising a buzzer, and said switch means further comprising a plurality of further switches, each being located proximate a respective one of said numbers for energization of said buzzer;
   whereby the educational device forms a self-contained integral structure with the respective numbers on said board being stimulative of the sense of sight and said indicator means when energized also effecting stimulation of at least one of the senses of sight, touch and hearing.

2. An educational device as set forth in claim 1, said buzzer being positioned within said hollow interior portion.

3. An educational device as set forth in claim 1, further comprising first and second switches, the former being coupled for energization of said buzzer to produce a relatively loud audible output and the latter being coupled in series with means for reducing power supplied to said buzzer for energization thereof to produce a relatively quite auible output.

4. An educational device as set forth in claim 1, wherein said spaces are capable of retaining markings written thereon.

5. An educational device as set forth in claim 1, further comprising a plurality of groups of sockets, each group being located in a respective one of said spaces relatively proximate to the number therein, and the quantity of sockets in each group corresponding to the quantity represented by the respective number in the shared space, and a plurality of pegs for insertion in said sockets.

6. An educational device as set forth in claim 5, each of said pegs being in the shape of a child.

7. An educational device for teaching numbers by stimulation of plural senses of the user, comprising:
   a rigid box-like package including a closed hollow interior portion and an accessible, generally planar exterior surface, and means for dividing said surface to a plurality of easily distinguishable discrete spaces;
   a plurality of different numbers on said surface, each of said numbers being located on said surface in a different respective discrete space to facilitate distinguishing between numbers, each of said numbers being raised relative to the plane of said surface, and said numbers also being arranged on said surface in a pattern to facilitate counting said numbers in a logical order;
   a plurality of groups of sockets, each group being located in a respective one of said discrete spaces relatively proximate to the number therein, the quantity of sockets in each group corresponding to the quantity represented by the respective number in the shared discrete space, and a plurality of pegs for insertion in said sockets;
   each of said spaces including means for retaining markings handwritten thereon;
   a pair of switches at each discrete space proximate the respective number in the shared discrete space;
   a plurality of electrically responsive sensorially perceivable indicator means for indicating closure of respective switches;
   and self-contained electric circuit means in said package, including an electric power supply entirely within the hollow interior of said package, for energizing said indicator means upon closure of respective switches;
   said indicator means comprising a plurality of lamps, each of said lamps being positioned relatively proximate to a respective one of said different numbers for illuminating the same, and one of said switch means in each discrete space being coupled by said electric circuit means for energization of the respective lamp for illuminating the respective number in the commonly shared space, said indicator means further comprising sound producing means for producing a sound upon energization thereof, and the second switch in each discrete space being coupled by said electric circuit means for energization of said sound producing means.

8. An educational device as set forth in claim 7, said means for dividing comprising means for dividing said surface to a plurality of easily distinguishable discrete spaces in a three by four array.

9. An educational device for teaching numbers by stimulation of plural senses of the user, comprising:
 an integral package including a container-like support and a board coupled to said support to define a closed hollow interior portion, said board having an accessible, generally planar surface, and said accessible surface being divided to a plurality of easily distinguishable discrete spaces;
 a plurality of different numbers on said board, each of said numbers being located on said surface in a different respective discrete space to facilitate distinguishing between numbers, each of said numbers being raised relative to the plane of said surface, and said numbers also being positioned in a pattern to facilitate counting said numbers in a logical order; and
 a self-contained electric circuit in said package, including power supply means for supplying electric power, switch means for closing at least a portion of said electric circuit, said switch means being mounted on said board for convenient access, and electrically responsive sensorially perceivable indicator means coupled to said power supply means and to said switch means for indicating closure of said switch means, said indicator means comprising a plurality of lamps, each being positioned relative to a respective one of said numbers for illuminating the same, said switch means comprising a plurality of switches, each being positioned proximate a respective number in the discrete space thereof and coupled with a respective lamp positioned for illuminating such number for selective energization thereof, said power supply means being entirely within said hollow interior portion of said integral package;
 each of said numbers being substantially hollow and translucent, and each of said lamps being positioned at least partially within a respective one of said numbers for illuminating the same;
 whereby the educational device forms a self-contained integral structure with the respective numbers on said board being stimulative of the sense of sight and said indicator means when energized also effecting stimulation of at least one of the senses of sight, touch and hearing.

* * * * *